United States Patent [19]

Rice

[11] Patent Number: 4,497,018
[45] Date of Patent: Jan. 29, 1985

[54] SERIES INVERTER FOR CAPACITOR CHARGING

[75] Inventor: Benjamin M. Rice, Natick, Mass.

[73] Assignee: Candela Corporation, Natick, Mass.

[21] Appl. No.: 491,983

[22] Filed: May 5, 1983

[51] Int. Cl.³ .............................................. H02M 7/515
[52] U.S. Cl. .......................................... 363/96; 363/58; 363/136; 315/241 R; 320/1
[58] Field of Search ..................................... 363/57–58, 363/96, 135–139; 320/1; 315/241 R, 241 P

[56] References Cited

U.S. PATENT DOCUMENTS

| | | | |
|---|---|---|---|
| 3,466,528 | 9/1969 | Adams | 363/136 |
| 3,935,528 | 1/1976 | Brenneisen et al. | 363/136 X |
| 4,030,021 | 6/1977 | Akamatsu | 363/135 |
| 4,366,570 | 12/1982 | Bees | 363/96 X |

Primary Examiner—Peter S. Wong

Attorney, Agent, or Firm—Hamilton, Brook, Smith and Reynolds

[57] ABSTRACT

A series inverter, high voltage capacitor charging circuit includes a current sensor for sensing the current through the load circuit. The sensed current is used to vary the gating frequency of SCRs and to preclude firing of an SCR pair until another SCR pair is in a stable off condition. The gating of each SCR pair is delayed by an amount of time determined by a control capacitor charging circuit. That charging circuit is inhibited as long as one of the SCRs is conducting and once the load voltage has reached a predetermined level. The time constant of that charging circuit is longer if insufficient reverse bias is applied to an SCR for quick turn-off of the SCR. The current sensing thresholds of common base transistors depend on whether forward or reflective current is being sensed. A series capacitor in the load circuit is discharged prior to a first cycle of current flow from the dc supply.

10 Claims, 3 Drawing Figures

SERIES INVERTER FOR CAPACITOR CHARGING

DESCRIPTION

1. Technical Field

This invention relates to series inverter circuits. It has particular application to such inverters used for charging high voltage capacitors such as those used to fire lasers.

2. Background

Lasers such as described in the U.S. Pat. No. 3,659,225 to Furumoto et al. use a high power flash to drive the laser. The near instantaneous, high voltage electrical input to such a flash lamp is provided by charging a large capacitor from line voltage to over fifteen kilovolts (kV). To fire the laser, the large capacitor is discharged into the flash lamp.

To provide the high voltage of over fifteen kV from a 110 V line voltage, a step up transformer is conventionally used. A transformer which could operate from line voltage and frequency would be unsuitably large. Thus, past charging supplies have first converted the ac line voltage to a dc voltage. The dc voltage is applied to a series inverter which generates an ac input to the charging transformer at a high frequency in the order of several kiloherz (kHz).

In a preferred series inverter charging circuit two silicon controlled rectifiers (SCR) are connected across the dc power supply to drive the primary of the charging transformer in a push-pull configuration. To provide maximum efficiency the SCR gating frequency should be very close to but less than the resonant frequency of the charging circuit. Early SCR series inverter circuits used a fixed gating frequency throughout the charging period. This frequency could not be optimum throughout the charging because, in capacitor charging, the load impedance varies from zero to a very high value. With that change in impedance the resonant frequency changes continually, and at best any fixed frequency is a compromise.

A more serious problem with series inverter switching supplies is that, if the gating frequency is not a predetermined amount less than the resonant frequency of the circuit, one SCR may be turned on before the other has stabilized in the off condition. The result is simultaneous conduction by the two SCRs and a short across the dc power supply. Because the switches are operated near the upper limits of their current handling capabilities, such a short circuit is likely to result in destruction of the SCRs. To minimize this problem, some series inverter circuits include circuits which sense this shorted condition and shut the inverter down. In an attempt to avoid such simultaneous conduction, the circuits are designed, based on the LC time constant of the circuit, to delay gating of each SCR for a predetermined time after the expected zero crossing of the ac charging current.

In a system described in U.S. Pat. No. 4,366,570 to Bees, the gating of the SCRs is controlled by a control capacitor charging circuit. The control capacitor charging circuit is inhibited so long as current through either SCR is sensed. Once that current drops to zero, the control capacitor charges to a level which gates the other SCR on. The control capacitor charging time is sufficient to allow each SCR to stabilize in the off condition before the other is gated on.

In U.S. patent application Ser. No. 444,213, filed Nov. 24, 1982, in the name of George L. Bees, a system is disclosed in which the time constant of the control capacitor charging circuit may be increased if insufficient reverse bias, resulting from reflective current, is applied to an SCR for quick turn-off of the SCR. Proper operation of the inverter circuit is very dependent on proper sensing of both forward and reflective current in the load circuit of the inverter.

After the load capacitor has been charged and then discharged the series inverter is again enabled to recharge the load capacitor. A current surge has been noted when the recharging operation first begins. Such surges can be greatly detrimental to the SCRs in the circuit which are operated at near the upper limits of their current capabilities.

DISCLOSURE OF THE INVENTION

A series inverter circuit has electronic switches connected in a push-pull configuration between a dc supply and a common load circuit. The common load circuit includes a series capacitor which retains a charge after the load is discharged.

In accordance with one aspect of the invention, the circuit includes means for discharging the series capacitor through the load prior to a first cycle of current flow from the dc supply. In a preferred embodiment, the series inverter circuit includes a full SCR bridge circuit with a reflective current diode in parallel with each SCR. Two SCRs are gated on to draw current from the dc supply through the common load circuit in a first direction and two other SCRs are gated on to draw current from the dc supply through the common load circuit in a second direction. When recharging is initiated, only one of a pair of SCRs is first gated on in order to discharge the series capacitor through the SCR and a reflective current diode. The second of the pair of SCRs is gated on only after the current resulting from discharge of the series capacitor has reached a peak.

To make a control capacitor charging circuit more discriminatory in sensing a drop in forward current or the presence of reflective current, a sensing circuit has a lower threshold in sensing forward current and includes means for reversing the thresholds of the circuit with reversal of the polarity of forward and reflective current. In a preferred embodiment, the sensing circuit comprises a forward/reflective current sensing transistor connected in a common base configuration. A current sensing resistor is connected as a base emitter biasing resistor, and the base emitter bias is a function of whether forward or reflective current is to be sensed.

In order to minimize the size of the current sensor required to sense the load current, a shunt capacitance is connected across the primary series capacitor and only the current through that shunt capacitance is sensed.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENT OF THE INVENTION

Figure 1:
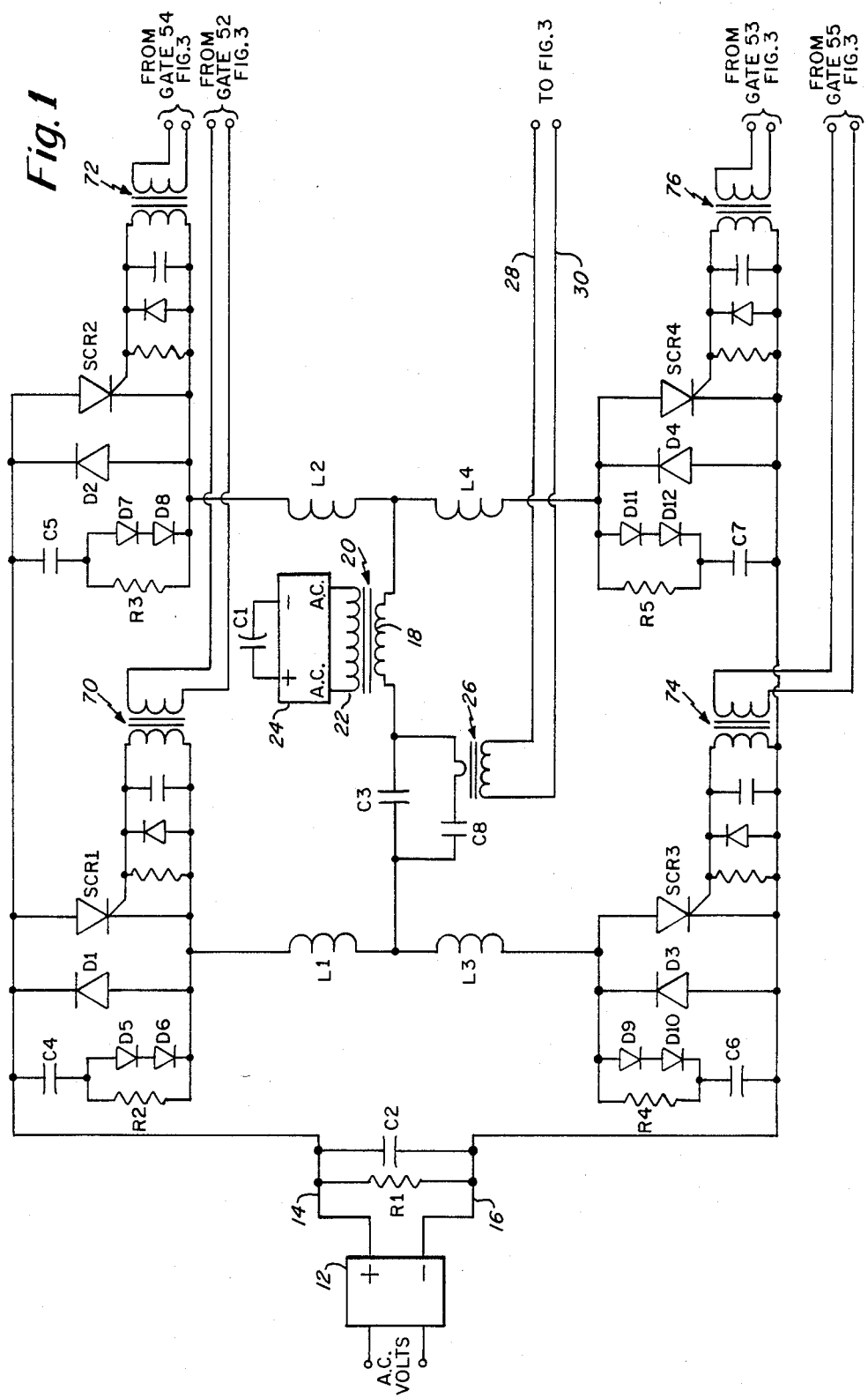
FIG. 1 is an electrical schematic diagram of a series inverter capacitor charging circuit embodying this invention.

FIG. 1 shows a capacitor charging series inverter circuit. The inverter is used to charge a high voltage capacitor load shown simply as a capacitor C1. That capacitor may, for example, be connected to a laser flash lamp firing circuit. Alternatively, the circuit may be used as a regulated high voltage dc power supply.

Line voltage is rectified by a rectifier 12 to provide a dc power supply across lines 14 and 16. The dc supply is filtered by an RC filter circuit R1, C2.

Four silicon controlled rectifiers SCR1, SCR2, SCR3 and SCR4 form a full bridge circuit between lines 14 and 16. The common load circuit of the SCR bridge includes the primary 18 of a transformer 20. The secondary 22 of that transformer is connected through a rectifier 24 to charge the capacitor C1.

A series capacitor C3 is also connected in the load circuit. Series inductors L1, L2, L3 and L4 are connected between respective SCRs and the load circuit. These inductors, the series capacitor C3 and the effective reactance seen at the primary of the transformer 20 determine the LC time constant of the circuit.

Diodes D1, D2, D3 and D4 are connected antiparallel to the SCRs to provide return paths for reflective current as will be discussed below. Also connected parallel to the SCRs are RC circuits such as capacitor C4, resistor R2 and diodes D5 and D6 in parallel with SCR1.

Figure 2:
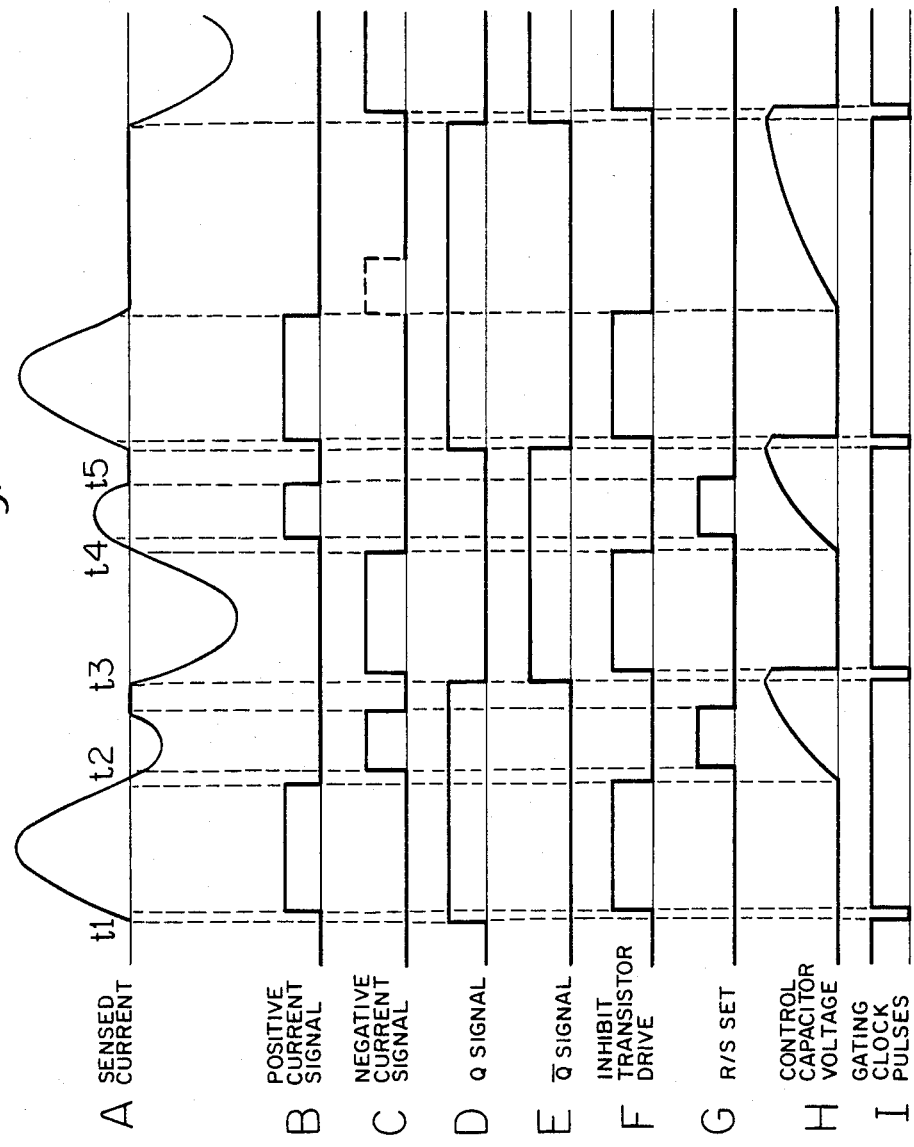
FIG. 2 is a timing chart for certain electrical signals in the series inverter circuit and its control circuit.

Operation of the inverter circuit of FIG. 1 can be best understood with reference to the current waveform A of FIG. 2. Current waveform A is that of the current through the common load circuit including the primary 18. If the SCRs SCR1 and SCR4 are gated on at time t1, current flows through those SCRs and series inductors L1 and L4 and through the series capacitor C3 and the primary 18. Because the dc voltage across lines 14 and 16 is applied to an LC circuit, the current flow through the SCRs is approximately sinusoidal. Thus, the current through the SCRs and the transformer winding 18 drops to zero at the resonant frequency of the circuit. From the zero crossing time t2, reflective current flows back through the transformer winding 18 and the diodes D1 and D4. When the charge on capacitor C1 is low, the reflective current is about equal in magnitude to the forward current between time t1 and t2. As the charge on capacitor C1 increases, the reflective current becomes less as shown in FIG. 2A.

With the end of forward current through SCR1 and SCR4, and particularly with a reverse bias due to the reflective current through the diodes D1 and D4, the SCRs turn off. Thereafter, at time t3, SCR2 and SCR3 are gated on to pull current through the transformer winding 18 in the reverse direction. This current is also sinusoidal and thus goes to zero at time t4 at which time the SCRs turn off. Reflective current continues through the diodes D2 and D3.

Proper switching of the SCRs in the inverter circuit generates an ac signal which is applied to the primary 18 of the transformer 20. That signal is stepped up to a high voltage on the secondary 22 of the transformer 20 and applied through a rectifier 24 to the load capacitor C1. With each cycle of the inverter circuit, the capacitor is charged an incremental amount.

It is important that each SCR pair not be gated on for some predetermined time after the other pair has turned off. If an SCR is not allowed to stabilize in the off condition, an SCR which next turns on can draw current through the first to hold the first on and create a short circuit between lines 14 and 16. The resultant high current would likely burn out the SCRs.

On the other hand, the gating on of the SCRs should not be delayed any longer than necessary. Thus, each SCR should be gated at a frequency which is as close as possible to the resonant frequency of the circuit while still precluding the possibility of a commutation failure. The control of the SCRs is further complicated by the fact that the resonant frequency of the circuit increases as the load capacitor is charged. Thus, as the time period t1-t2 decreases with charging of the capacitor, the time t1-t3 must also decrease. Otherwise, the time during which no current flows through the primary winding 18 would increase and the efficiency of the circuit would be reduced.

Proper timing of the SCR control is obtained by first sensing the current through the common load circuit. To that end, a small shunt capacitor C8 is placed in parallel with the series capacitor C3. The current through the capacitor C8 is a small proportional amount of the total current through the primary 18; it is sensed by means of a current sensing transformer 26 and applied to leads 28 and 30 of the control circuit of FIG. 3. This current sensing transformer senses the signal A of FIG. 2.

It should be noted that signal A indicates that each SCR is switched on only after the reflective current has settled to zero. This simplifies the discussion of the circuitry which follows. However, it will be recognized that each SCR might be switched on more quickly such that the forward current between times t3 and t4 overlaps the reflective current after time t2. The two currents would reinforce each other. The SCRs should not be turned on so quickly, however, that the previously conducting SCRs do not have sufficient time to completely turn off.

Figure 3:
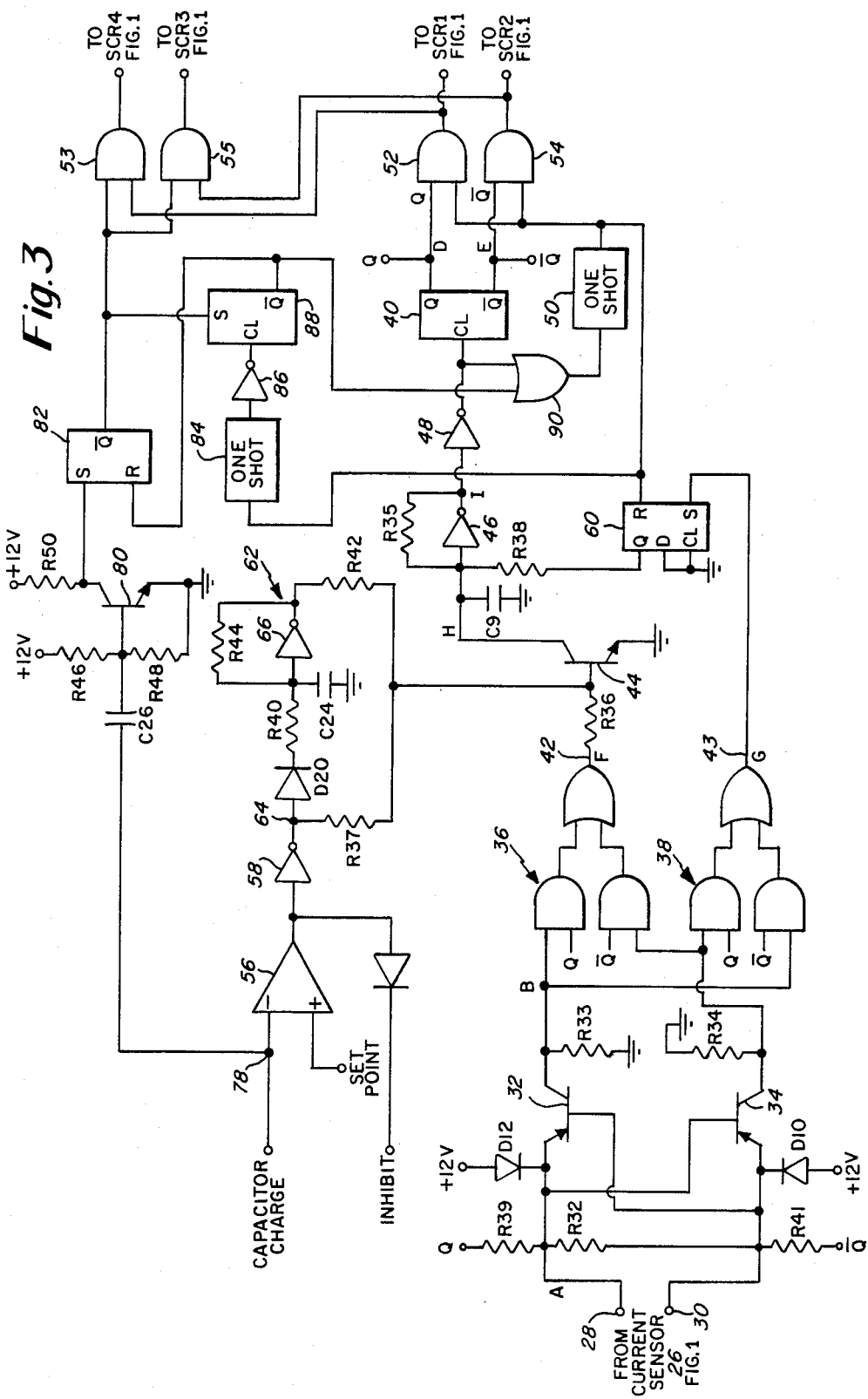
FIG. 3 is a simplified electrical schematic of the SCR control circuit for sensing current in the circuit of FIG. 1 and for controlling gating of the four SCRs in that circuit.

The current from the current sensing transformer 26 is applied across resistor R32 in the control circuit of FIG. 3. Positive current flowing from line 30 through the current transformer into line 28 results in a sufficient voltage drop across resistor R32 to turn transistor 32 on to draw current through diode 10 and apply the current across a pull down resistor 35. The transistor 32 thus senses any positive current, either the positive forward current as between times t1 and t2 or the positive return current as between times t4 and t5. The resultant signal is shown on line B of FIG. 2. The transistor 34 similarly senses negative current through the current sensor and provides the signal on line C.

Due to emitter drive, the common base configuration of the transistors 32 and 34 provides very rapid switching of the outputs as thresholds determined by the base biasing circuitry are reached.

The signals B and C of FIG. 2 are applied to the inputs of logic circuits 36 and 38. The Q and Q- inputs to the logic circuits are taken from a flip flop 40 and are shown at D and E of FIG. 2. The flip flow 40 selects the pair of SCRs, SCR1 and SCR4 or SCR2 and SCR3 which is to be gated next. Depending on the state of the Q and Q- signals, the positive current signal B is applied to line 42 and the negative current signal C is applied to line 43 or, alternatively, the negative current signal C is applied to line 42 and the positive current signal B is applied to line 43.

The signals applied to lines 42 and 43 are shown at F and G of FIG. 2. It can be seen that the signal on line F is an indication of whether any of the SCRs pairs are conducting. For reasons to be discussed below, the signal G on line 43 indicates whether reflective current is flowing back through the transformer winding 18.

Neither SCR pair is to be gated on while the other pair is conducting. Thus, the signal F, which indicates whether either SCR pair is conducting, is applied through a resistor R36 to the inhibit transistor 44. When signal F indicates that either SCR is conducting, transistor 44 is turned on and a capacitor C9 discharges. Once the current through an SCR nears its zero crossing, the signal on line 42 goes low and transistor 44 turns off. This allows capacitor C9 to be charged through the resistor R35 connected across a Schmitt trigger inverter 46. The voltage on the control capacitor C9 is illustrated at H in FIG. 2.

Once the capacitor C9 is charged to a level sufficient to trigger the inverter 46, a gating clock pulse (FIG. 2I) is sent through an inverter 48 to the SCR control flip flop 40. As noted above, the Q and Q- outputs of the flip flop 40 determine which SCRs are to be gated on.

The time during which a forward bias is to be applied to the gates of each SCR pair is determined by a one shot multivibrator 50 whose output is applied to AND gates 52 and 54 along with the Q and Q- signals. The drive circuitry to the gates of SCR 1 and SCR 2 are enabled directly by AND gates 52 and 54. SCR 3 and SCR 4 are enabled through additional AND gates 53 and 55 as will be described below.

Signals from the AND gates 52, 53, 54 and 55 are used to drive SCR gating transformers 70, 72, 74 and 76 in the inverter circuit of FIG. 1.

Thus, triggering of the Schmitt trigger 46 after charging of the capacitor C9 initiates gating of the SCRs which were in the off condition during the previous cycle. The charging time of the capacitor C9 is determined by resistor R35. The resistor R35 and the capacitor C9 are selected to provide a control capacitor charging time matching the time required for an SCR to stabilize in the non-conducting state under worse case conditions.

As each SCR pair is turned on, a signal is applied through the current sensor 26 and the logic circuit 36 to turn the transistor 44 on. This discharges the capacitor C9 and inhibits further clocking of the flip flop 40 until the particular SCRs turn off.

It should be recognized that the time between SCR gating pulses is determined directly by the "on" time of the SCRs. A short time interval required for each SCR to stabilize is added to that "on" time. Thus, as the on time decreases with charging of the load capacitor C1, the time between gating pulses also decreases. A single feedback circuit has both precluded simultaneous conduction by the SCRs and provided a varying frequency, load dependent, gate driving oscillator.

As noted above, signals which indicate there is a reflective current passing through the diodes D1, D4 or D2, D3 are provided at G on line 43. That reflective current assists rapid turn off of each SCR pair. However, under certain conditions, the reflective current may be minimal. Under those conditions, longer time is required for the SCR to turn off. For that reason a long period of time should be allowed between the time the current stops flowing through an SCR pair and the time that the other SCR pair is turned on. Otherwise, turning on of the second SCR pair might result in simultaneous conduction through the first SCR pair which had not yet stabilized to an off condition.

To avoid the dangerous condition of simultaneous conduction of the SCR pairs, the present circuit allows for rapid charging of the capacitor C9 when reflective current is sensed but provides for a slower charging of that capacitor when no reflective current is sensed. Accordingly, the signal on line 43 is applied to the set input of a flip flop 60. Where a reflective current is sensed, as in the first two cycles of signal A in FIG. 2, the flip flop 60 is set. This results in an a high Q output from flip flop 60 which is applied across the resistor R38 to assist in charging of the capacitor C9.

If, on the other hand, little or no reflective current is present, as in the third cycle of signal A of FIG. 2, the reverse current signal shown in broken lines in FIG. 2C is not obtained and a set signal is not applied along line 43 to the flip flop 60. It can be noted that the flip flop will have been reset by the output of the one shot 50 in the previous cycle. Thus, the signal on the Q output of flip flop 60 remains low and the capacitor C9 is charged only through the resistor R35. A longer time is then required for the capacitor C9 to charge to a level which triggers the inverter 46 as indicated at FIG. 2H. This results in a delay of the gating clock pulse I which triggers the gating of the next SCR pair.

Because forward SCR current as sensed by the transformer 26 is positive in one cycle and negative in the next cycle, the roles of the transistors 32 and 34 in sensing forward and reflective current are alternated by the logic circuits 36 and 38. If only the resistors R32 and R34 provided the base emitter biasing to the transistors 32 and 34, the same threshold would be used to sense both forward current and reflective current. However, it is important that the end of forward current not be sensed too early and it is also important that the existence of reflective current be certain before setting the flip flop 60. These two concerns are contradictory when one attempts to set the current thresholds for triggering the transistors 32 and 34. A low threshold of, for example, five amps is preferred for sensing forward current. Thus, a loss of forward current will not be indicated until that current has dropped below five amps. On the other hand, a threshold of, for example, 15 amps is preferred as the threshold for identifying reflective current.

The base-emitter biasing of the transistors 32 and 34 allows for reversing of the thresholds of the circuit with a reversal in the polarity of the forward and reflective currents. A high Q signal which directs the positive current signal B through the logic circuit 36 as forward current also assists in turning on the transistor 32; it is applied across the resistor R39 in the emitterbase biasing circuit. As a result, the transistor 32 is held on until the forward current drops below five amps. A low Q-signal applied to the resistor R41, on the other hand, tends to hold transistor 34 off so that the threshold for detecting negative reflective current is increased. During the next cycle, the Q signal goes low to increase the threshold of the transistor 32 sensing circuit, the output of which is directed by the high Q- signal through logic circuit 38. Also, the high Q- signal across resistor 41 decreases the threshold of that circuit in directing a negative, forward current signal through the logic circuit 36.

To regulate the voltage to which the load capacitor C1 is charged, the charge on that capacitor is detected through a voltage divider (not shown) to provide an input signal at the inverting input of a comparator 56. That input is compared to a set point voltage, and the output of the comparator goes low when the charge voltage matches the set point. With the output of comparator 56 low, the inverter 58 applies a high signal across the resistor R37 to turn transistor 44 on. This discharges the control capacitor C9 and further charging of both the control capacitor and the load capacitor C1 are inhibited as long as the load charge is at the set point.

The circuit of FIG. 3 also includes means for disabling the inverter circuit if the load capacitor fails to charge in a reasonable time. To that end, a Schmitt trigger circuit 62 is provided. If the circuit 62 sees a high voltage at point 64, which indicates that the load capacitor is sufficiently charged, the capacitor C24 is quickly charged through the diode D20 and resistor R40. This causes the output of inverter 66 to remain low. The output of the inverter 66 is applied to the inhibit transistor 44 through a resistor R42.

The resistors R36, R37 and R42 serve as a logic OR-gate. Thus, if the voltage applied to any of those resistors is high, transistor 44 turns on and the SCR gating circuit is disabled; otherwise, the transistor 44 remains off.

Once the load capacitor has discharged, the signal on line 64 goes low to return control of the transistor 44 to the logic circuit 36. The diode D20 blocks discharge of the capacitor C24 through resistor R40 so the output of inverter 66 remains low. A relatively large resistor R44 is connected across the inverter 66. The capacitor C24 is able to discharge through that resistor over a long time period. If, after that long time required for the capacitor C24 to discharge, the capacitor has not been recharged quickly through diode D20 and resistor R40, the output of the inverter 130 finally goes high to turn the transistor 44 on and disable the inverter circuit. Thereafter, the Schmitt trigger 62 oscillates with the capacitor C24 now being charged and discharged through the resistor R44. When the output is triggered low, after charging of the capacitor, the transistor 44 is again returned to the control of the logic circuit 36.

In effect, the Schmitt trigger 62 reduces the power applied through the inverter by enabling the inverter throughout a duty cycle determined by the Schmitt trigger. This prevents burning out of any circuit elements if the load capacitor C1 is shorted out. It does allow some charging to continue, however, so that the load capacitor will be charged if the short is removed. Once the short has been removed and the capacitor C1 has been slowly charged atthe duty cycle determined by the Schmitt trigger 62, the signal on line 64 finally goes high to drive the output of the Schmitt trigger low. Thereafter, the Schmitt trigger has no effect on the circuit unless the charge in the capacitor C1 is removed for the extended length of time.

Alternatively, rather than allowing the Schmitt trigger 62 to oscillate, it could be latched to maintain a high output from the inverter 66 to disable the circuit. By resetting the latch and recharging the capacitor C24, the circuit can be allowed to continue its operation.

Another feature of the control circuit of FIG. 3 is that it allows for discharge of the series capacitor C3 in the load circuit prior to the first cycle of operation of the circuit. As can be seen in FIG. 2A, with a high charge on the load capacitor C1, the reflective current is significantly less than the forward current in any cycle. As a result, after any cycle a charge remains across the capacitor C3. This charge remains after the load capacitor has been charged and discharged. Thereafter, in the first cycles of recharging, the remaining charge on series capacitor C3 would be cumulative with the supply voltage on capacitor C2 to provide a high input voltage. This high input voltage could increase the current through the SCRs to a level above their current handling capabilities.

To avoid that high current at the start of recharging, the capacitor C3 is discharged before a circuit is completed across the dc input lines 14 and 16. Accordingly, only a single SCR is initially turned on. For example, SCR 1 can be turned on to discharge the capacitor C3 through diode D2. SCR 4 remains off until after the peak discharge current level has been reached. Then, SCR 4 is also gated on so that the inverter circuit goes into normal operation. With a low charge on the capacitor C1, the reflective current has substantially the same magnitude as the forward current, so after this first cycle no charge is left on the capacitor C3. Thus, in the next cycle SCR 2 and SCR 3 can be gated on simultaneously without concern for excessive current resulting from any charge on capacitor C3.

It can be noted that the discharge current from the capacitor C3 is applied through the primary 18 of the output transformer 20 to assist in charging the capacitor C1. However, that current is applied through the transformer before the current from the dc input is applied to avoid the excessive current situation.

The logic circuit which allows for initial gating of a single SCR during the initial cycle of the inverter is shown in FIG. 3. The signal on line 78 which indicates the charge on the load capacitor C1 is differentiated by a capacitor C26. When the capacitor C1 is discharged, a sharp drop in the signal on line 78 is seen as a positive pulse at the output of the inverting transistor 80. That pulse sets an inhibit flip flop 82 which drives the Q-output of that flip flop low. With that low signal applied to AND gates 53 and 55, SCR 3 and SCR 4 are inhibited. SCR 1 or SCR 2 is gated on with the next gating signal received from one shot 50.

SCR 3 and SCR 4 are only inhibited for a short time during which either SCR 1 or SCR 2 discharges the series capacitor C3. To that end, the gating signal from one shot 50 is applied to another one shot 84. The output of that one shot is inverted by an inverter 86 so that, at the falling edge of the pulse from the one shot 84, a clock pulse is applied to a flip flop 88. The Qoutput of flip flop 88 is normally held low by the signal applied to the set input of the flip flop. However, when a low inhibit signal is received from the flip flop 82, the Q-output is free to go high with the next clock signal to reset the flip flop 82. That high Q- signal from flip flop 88 is also applied through an OR gate 90 to the one shot 50 to initiate another SCR gating pulse.

From the above, it can be seen that a high input is normally applied to AND gates 53 and 55 so that any pair of SCRs can be gated on by a signal from one shot 50 according to the Q and Qsignals at D and E. However, when the load capacitor discharges, an inhibit signal is applied to the AND gates 53 and 55 to inhibit gating of SCR 3 and SCR 4 during the next gating pulse from one shot 50. During that gating pulse, either SCR 1 or SCR 2 is gated on but the associated SCR, SCR 3 or SCR 4, is inhibited. After a time determined by the one shot 84, the disabling signal applied to the AND gates 53 and 55 is removed. Also, another gating pulse is applied from the one shot 50. At that time, a full pair of SCRs, SCR 1 and and SCR 4 or SCR 2 and SCR 3, are gated on. SCR 3 and SCR 4 are not again disabled until discharge of the load capacitor C1.

The timing of one shot 84 is such that the second gating pulse applied by one shot 50 is applied after the peak discharge current from capacitor C1 but before the end of that discharge current. Specifically, the second gating pulse is provided at a time $t=T/3$ after the first gating pulse, where T is the period of circuit resonance.

It should be recognized that, although SCR 3 and SCR 4 are disabled by this circuitry, any adjacent SCRs in the bridge of FIG. 1 could be disabled. Either one of the two SCRs which are to be gated next can be disabled. Because diagonal SCRs operate as pairs, adjacent SCRs can be inhibited.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A series inverter circuit having electronic switches connected in a push-pull configuration between a dc supply and a common load circuit and a series capacitor in the common load circuit, the series inverter circuit comprising means for discharging the series capacitor through the load prior to a first cycle of current flow from the dc supply.

2. A series inverter circuit as claimed in claim wherein the electronic switches are gated for a first cycle of current flow from the dc supply after a peak in discharge current from the series capacitor through the load.

3. A series inverter circuit as claimed in claim comprising:
    a full silicon controlled rectifier bridge circuit with a reflective current diode in parallel with each SCR;
    means for gating two SCRs of the bridge circuit on to draw current from the dc supply through the common load circuit in a first direction and for gating two other SCRs of the bridge circuit on to draw current from the dc supply through the common load circuit in a second direction; and
    means for gating a single one of two SCRs on to discharge the series capacitor prior to a first cycle of current flow through said two SCRs from the dc power supply.

4. A series inverter circuit as claimed in claim further comprising a load capacitor in a laser firing circuit which is charged through a transformer in the common load circuit.

5. A laser firing circuit having a series inverter circuit with electronic switches connected in a push-pull configuration between a dc supply and a common load circuit and a series capacitor in the common load circuit, the series inverter circuit comprising:
    a full SCR bridge circuit with a reflective current diode in parallel with each SCR;
    means for gating two SCRs of the bridge circuit on to draw current from the dc supply through the common load circuit in a first direction and for gating two other SCRs of the bridge circuit on to draw current from the dc supply through the common load circuit in a second direction; and
    means for gating a single one of two SCRs on to discharge the series capacitor prior to a first cycle of current flow through said two SCRs from the dc power supply.

6. A laser firing circuit as claimed in claim 5 wherein the electronic switches are gated for a first cycle of current flow from the dc supply after a peak in discharge current from the series capacitor through the load.

7. A series inverter circuit having electronic switches connected in a push-pull configuration between a dc supply and a common load circuit and a series capacitor in the common load circuit, the series inverter circuit comprising:
    a sensing circuit for sensing forward and reflective current through the common load circuit, the sensing circuit having a lower threshold in sensing forward current;
    means for enabling a timing circuit to gate an electronic switch after a drop in forward current is sensed;
    means for changing the timing of the timing circuit after a reflective current is sensed; and
    means for reversing the thresholds of the sensing circuit with reversal of the polarity of forward and reflective currents.

8. A series inverter circuit as claimed in claim wherein the sensing circuit comprises a forward/reflective current sensing transistor connected in a common base configuration with a current sensing resistor connected as a base-emitter biasing resistor and the baseemitter bias is a function of whether forward or reflective current is sensed.

9. A series inverter circuit as claimed in claim further comprising a load capacitor in a laser firing circuit which is charged through a transformer in the common load circuit.

10. A series inverter circuit as claimed in claim wherein the sensing circuit comprises a shunt capacitor in parallel with said series capacitor in the common load circuit and a current sensing winding in series with the shunt capacitor.

* * * * *